United States Patent Office 2,959,614
Patented Nov. 8, 1960

2,959,614

2-AMINO-3(BETA-AMINOETHOXY)-PROPIONIC ACID AND ITS DIHYDROCHLORIDE SALT

Tommy J. McCord, 1734 Westmoreland, Abilene, Tex., and William Shive, 843 E. 38th St., Austin, Tex.

No Drawing. Filed Oct. 9, 1958, Ser. No. 766,211

3 Claims. (Cl. 260—534)

This invention relates to the new compound 2-amino-3-(beta-aminoethoxy)-propionic acid and to its dihydrochloride salt having biological activity.

In a preferred method of preparation for the acid compound of this invention, an acetamidomalonic ester is condensed with 2-chloroethyl chloromethyl ether. The product of this condensation, 2-acetamido-2-(beta-chloroethoxymethyl)-malonate, is obtained in a conversion of about 38 percent, and this substituted malonic ester derivative in turn is treated with concentrated ammonium hydroxide at room temperature for several days to replace the terminal chlorine by an amino group, and then acid hydrolyzed.

Alternatively, the malonic ester derivative is hydrolyzed and decarboxylated prior to the ammonia treatment. Direct ammonolysis of the malonic ester derivative results in a mixture of products which can be hydrolyzed directly and isolated through column chromatography.

The ultimate reaction mixture via either of the above-mentioned routes is separated into several components by placing it on an alumina column and eluting with various concentrations of alcohol-water. The course of this separation is followed by paper chromatography using ninhydrin, supplemented by bioassays and bioautographs to determine the position and concentration of the active principle. Four major ninhydrin active products are present in the final reaction mixture prior to column purification, but only one of these, identified as 2-amino-3-(beta-aminoethoxy)-propionic acid or dl-4-oxalysine, is biologically active in the assay system used.

In another possible route to 4-oxalysine, the appropriately substituted dihalo derivative can be prepared, followed by subsequent replacement of the halogens with an amino group. For example, methyl 2-bromo-3-(beta-chloroethoxy)-proprionate is prepared by the condensation of 2-chloroethanol and methyl acrylate in the presence of mercuric acetate, followed by bromination. Ammonolysis of the resulting dihaloester results in the formation of a mixture of products similar to that described above via the acetamidomalonic ester route. Yields of the desired 4-oxalysine in this route are very small, on the order of only one percent. It can be separated by chromatography on an alumina column and the 4-oxalysine identified by paper chromatographic techniques and bioassays as described above.

The preparation of the dihydrochloride salt of 4-oxalysine is described in detail below.

The compounds of this invention inhibit the growth of a number of microorganisms. This inhibitory action of 4-oxalysine is reversed by lysine, and, in extensive studies with Leuconostoc dextranicum 8086, this inhibitory action has been found to be competitively reversed over a 300-fold range of concentrations with an inhibition index from 1 to 3.

The following examples describe in detail the preparation of 2-amino-3-(beta-aminoethoxy)-propionic acid, its dihydrochloride salt and intermediates therefor.

EXAMPLE 1

*Preparation of ethyl 2-acetamido-2-(beta-chloroethoxymethyl)-malonate*

2-chloroethyl chloromethyl ether was prepared by the procedure of Lingo and Henze, J.A.C.S. 61, 1574 (1939), using aqueous formaldehyde (37%), 2-chloroethanol and hydrogen chloride. To a hot solution of 86.6 g. of ethyl acetamidomalonate dissolved in 300 ml. of magnesium-dried ethanol containing 9.16 g. of sodium was added 51.3 g. of freshly distilled 2-chloroethyl chloromethyl ether in small batches with vigorous shaking. Sodium chloride precipitated immediately from the highly exothermic reaction. After addition was completed, the reaction mixture was heated to reflux for 3 hours. The salt was removed, and the solvent was distilled under reduced pressure. The residue was freed of alcohol by repeated addition and distillation under reduced pressure with benzene. By adding Skellysolve G (B.P. 40°–70°) to a benzene solution of the residue and chilling in the refrigerator, there was recovered a total of 42.2 g. of unreacted ethyl acetamidomalonate in several fractions. The organic solvents were then removed, and there was obtained 55.1 g. of crude material in the form of an oil. This product was continuously extracted with Skellysolve G for 48 hours. A pale yellow oil, 40 g., separated from the solvent distilling flask but failed to solidify, even in the deep freeze chest. Twenty grams of this oil was fractionally distilled in vacuo to yield 12.0 grams of ethyl 2-acetamido-2-(beta-chloroethoxymethyl)-malonate, boiling point 165°–175° C. (3 mm.).

*Analysis.*—Calcd. for $C_{12}H_{20}ClNO_6$: C, 46.53; H, 6.51. Found: C, 46.58; H, 6.24.

Preparation of DL-4-oxalysine

A mixture of 12.0 g. of the malonic ester derivative and 150 ml. of concentrated ammonium hydroxide was shaken continuously for 72 hours during which time complete solution was effected. After reducing to dryness under reduced pressure, the excess ammonium hydroxide was removed by repeated addition and evaporation of ethanol. The residue was dissolved in 120 ml. of 6 N hydrochloric acid and heated under reflux for 2.5 hours, after which the hydrochloric acid was removed under reduced pressure, with warming, and the residue was freed of residual hydrochloric acid by repeated addition and evaporation of ethanol. The resulting solid was leached with 50 ml. of ethanol, and the ammonium chloride was removed by filtration. The filtrate was then taken to dryness under reduced pressure to yield 8.0 g. of material.

A paper chromatogram of this reaction mixture in 1-butanol:acetic acid:water (3:1:1) using the ascending technique, showed, on development with ninhydrin, the presence for four spots with $R_f$ values of 0.07, 0.16, 0.30 and 0.43. A bioautograph of 100 gamma of the reaction mixture using L. dextranicum 8086 showed a zone of inhibition corresponding only to the $R_f$ 0.07 spot, and in a tube assay the solution was inhibitory at a concentration of 0.4 gamma/ml. The other ninhydrin spots were subsequently identified as glycine, 3-morpholinecarboxylic acid and 2-amino-3-(beta chloroethoxy)-propionic acid, respectively.

The reaction products were separated by column chromatography and subsequent recrystallization. A 3.5 x 25 cm. column containing 80 g. of activated alumina (Alcoa) was prepared in 90% alcohol. Eight grams of the above reaction mixture was charged to this column and fractionally eluted with alcohol-water solutions of varying concentrations:

| Composition of Eluent | Total Volume Effluent | Biological Activity, Percent |
|---|---|---|
| 90% ethyl alcohol | 400 | 0 |
| 75% ethyl alcohol | 400 | 10 |
| 50% ethyl alcohol | 800 | 60 |

DL-4-oxalysine (2-amino-3-(beta-aminoethoxy)-propionic acid) dihydrochloride

The 50% alcohol fraction above was evaporated to dryness under reduced pressure to yield 780 mg. of residue. A water solution of this material was acidified to pH 1 with dilute hydrochloric acid and then concentrated in volume under reduced pressure. The addition of alcohol to this concentrated solution yielded 421 mg. of solid product, which was recrystallized from ethanol-ethyl acetate solution to give small white needles, M.P. 190°–200° dec. The $R_f$ values, using the ascending technique and development with ninhydrin, in 1-butanol: acetic acid: water (3:1:1), 65% pyridine and 95% methanol were 0.07, 0.20 and 0.15, respectively.

*Analysis.*—Calcd. for $C_5H_{14}Cl_2N_2O_3$: C, 27.16; H, 6.38; N, 12.67. Found: C, 26.95; H, 6.46; N, 12.87.

2-amino-3-(beta-chloroethoxy)-propionic acid

After standing in the cold overnight, a white crystalline solid precipitated in the initial 100 ml. of 90% alcohol effluent from the alumina column above. It was filtered, washed with cold ethanol and dried under vacuum over anhydrous calcium chloride to yield 250 mg. of product, M.P. 178°–180°. This material was biologically inactive in the assay system and was characterized by chemical analysis and by subsequent conversion to 4-oxalysine with concentrated ammonium hydroxide. The $R_f$ values, using the ascending technique and development with ninhydrin, in 1-butanol:acetic acid:water (3:1:1), 65% pyridine and 95% methanol were 0.43, 0.70 and 0.56, respectively.

*Analysis.*—Calcd. for $C_5H_{10}ClNO_3$: C, 35.83; H, 6.01. Found: C, 35.90; H, 6.02.

EXAMPLE 2

Methyl 2-bromo-3-(beta-chloroethoxy)-propionate

A mixture of 23.1 g. of methyl acrylate, 79.4 g. of mercuric acetate and 200 ml. of 2-chloroethanol was shaken at room temperature for 48 hours. To the cooled reaction mixture, 29.75 g. of potassium bromide, dissolved in 300 ml. of water, was added slowly with stirring, and the resulting oil was recovered. The aqueous phase was extracted with chloroform, and the combined organic phase was dried over magnesium sulfate. After decantation from the drying agent, 40.0 g. of bromine was added dropwise, over a period of 1 hour, to the chloroform solution illuminated with a 250 watt photoflood bulb, while maintaining a reaction temperature of 50°–55° with occasional cooling. Upon refrigeration of the reaction mixture, 68 g. of mercuric bromide precipitated, which was filtered, and the filtrate was distilled under reduced pressure to yield a forerun of 19.0 g. of material, B.P. 30°–90° (3 mm.). The resulting residue yielded additional mercuric bromide which was removed prior to continued distillation of the dark oil. There was recovered 35 g. of crude dihaloester which was fractionally redistilled to yield 23.4 g. of material, B.P. 96°–102° (3 mm.), $n^{25}_D$ 1.4783.

*Analysis.*—Calcd. for $C_5H_{10}BrClO_3$: C, 29.35; H, 4.11. Found: C, 29.46; H, 4.36.

Ammonolysis and hydrolysis of methyl 2-bromo-3-(beta-chloroethoxy)-propionate

A. The ester was placed in a 150 x 25 mm. glass tube and immersed in a Dry Ice-acetone bath, following which an equal volume of liquid ammonia was condensed in the cold section. The bomb was then sealed and allowed to stand at room temperature for 12 hours, after which time a precipitate of ammonium halide was observed. The reaction mixture was cooled, the bomb opened, and the excess ammonia was allowed to evaporate at room temperature. The residue was extracted with hot ethanol and subsequently taken up in water to yield a reaction mixture which proved to be biologically inactive. The major products were identified as 3-morpholinecarboxylic acid and 2-amino-3-(beta-chloroethoxy)-propionic acid.

B. A sample of the ester was placed in concentrated ammonium hydroxide and allowed to stand at room temperature for several days to effect complete solution of the oil phase. After removal of the solvent, the residue proved to contain only a small amount of 4-oxalysine, as evidenced by paper chromatography and bioassay, along with some 3-morpholinecarboxylic acid and 2-amino-3-(beta-chloroethoxy)-propionic acid.

C. The above conditions were repeated except that the reaction mixture was heated at 100° in a steel bomb for 24 hours. The solvent was removed, and the residue was placed on an alumina column and eluted with alcohol-water solutions, as previously described, to yield 4-oxalysine (1% yield) and 3-morpholinecarboxylic acid.

As stated above, 4-oxalysine inhibits the growth of a number of microorganisms. Under the testing conditions subsequently described, the inhibitory levels of this compound using 7 different bacteria are recorded in Table I.

TABLE I.—INHIBITORY ACTIVITY OF 4-DL-OXALYSINE AND REVERSAL BY DL-LYSINE

| Supplements | Inhibitory Level of 4-Oxalysine, gamma/ml. | |
|---|---|---|
| | None | DL-Lysine, 20 gamma/ml. |
| Microorganism: | | |
| Leuconostoc dextranicum 8086 | 0.1 | 100 |
| Leuconostoc mesenteroides 8293 | .1 | 100 |
| Streptococcus lactis 8039 | .3 | 300 |
| Lactobacillus arabinosus 17–5 | 10 | 1,000 |
| Lactobacillus casei 7469 | 0.3 | 30 |
| Streptococcus fecalis 8043 | (¹) | 1,000 |
| Escherichia coli 9723 | 3 | >1,000 |
| Escherichia coli Texas strain | 3 | >1,000 |

¹ This organism requires lysine for growth.

The inhibitory levels vary from 0.1 gamma/ml. for *Leuconostoc dextranicum* 8086 and *Leuconostoc mesenteroides* 8293 to 10 gamma/ml. for *Lactobacillus arabinosus* 17–5. In the presence of a 20 gamma/ml. supplement of DL-lysine, the inhibitory level is raised to 100 gamma/ml., 100 gamma/ml. and 1000 gamma/ml., respectively, for each organism. The reversal of 4-oxalysine inhibitory action by lysine has been studied more extensively with *L. dextranicum* as indicated in Table II, and this compound was found, as stated above, to be competitively reversed by the natural amino acid over a 300-fold range with an inhibition index from 1 to 3.

TABLE II.—REVERSAL OF 4-DL-OXALYSINE INHIBITION BY DL-LYSINE

[Test organism, *L. dextranicum* 8086, incubated 18 hr. at 30°]

| 4-DL-Oxalysine, gamma/ml. | DL-Lysine, gamma/ml. | | | | | | |
|---|---|---|---|---|---|---|---|
| | 0 | 0.1 | 0.3 | 1.0 | 3.0 | 10.0 | 30.0 |
| | Galvanometer readings | | | | | | |
| 0 | 54 | 60 | 61 | 61 | 61 | 61 | 60 |
| 0.03 | 34 | 57 | 60 | | | | |
| 0.1 | 1 | 16 | 57 | 60 | | | |
| 0.3 | | 3 | 4 | 56 | 59 | | |
| 1.0 | | | | 11 | 52 | 58 | |
| 3.0 | | | | 0 | 27 | 57 | 59 |
| 10.0 | | | | | 1 | 52 | 53 |
| 30.0 | | | | | | | 48 |
| 100.0 | | | | | | | 1 |

The invention claimed is:
1. A compound selected from the group consisting of 2-amino-3-(beta-aminoethoxy)-propionic acid and its dihydrochloride salt.
2. 2-amino-3-(beta-aminoethoxy)-propionic acid.
3. (2-amino-3-(beta-aminoethoxy)-propionic acid) dihydrochloride.

References Cited in the file of this patent

UNITED STATES PATENTS

| | | |
|---|---|---|
| 2,569,801 | Cook et al. | Oct. 2, 1951 |
| 2,762,815 | Pohland | Sept. 11, 1956 |
| 2,783,274 | White et al. | Feb. 26, 1957 |